United States Patent [19]
Steppi

[11] 3,768,895
[45] Oct. 30, 1973

[54] CINEMATOGRAPHIC APPARATUS
[75] Inventor: Hubert Steppi, Garching, Germany
[73] Assignee: Agfa-Gevaert Aktiengesellschaft, Leverkusen, Germany
[22] Filed: June 23, 1972
[21] Appl. No.: 265,776

[30] Foreign Application Priority Data
Sept. 17, 1971 Germany .................. P 21 46 526.9

[52] U.S. Cl. .............................................. 352/166
[51] Int. Cl. ...................... G03b 1/22, G03b 19/18
[58] Field of Search ................................... 352/166

[56] References Cited
UNITED STATES PATENTS
3,428,394  2/1969  Wessner .............................. 352/166

Primary Examiner—Samuel S. Matthews
Assistant Examiner—Russell E. Adams, Jr.
Attorney—Michael S. Striker

[57] ABSTRACT

A motion picture camera or projector wherein the rotor of an electric motor constitutes the shutter. The motor has a flat housing a portion of which is located between the picture taking lens and the light-admitting opening of a film guide and has a second opening which admits scene light from the lens to the opening of the guide or vice versa in predetermined angular positions of the shutter. The shutter is rigid with a cam which actuates the claw pull-down.

10 Claims, 3 Drawing Figures

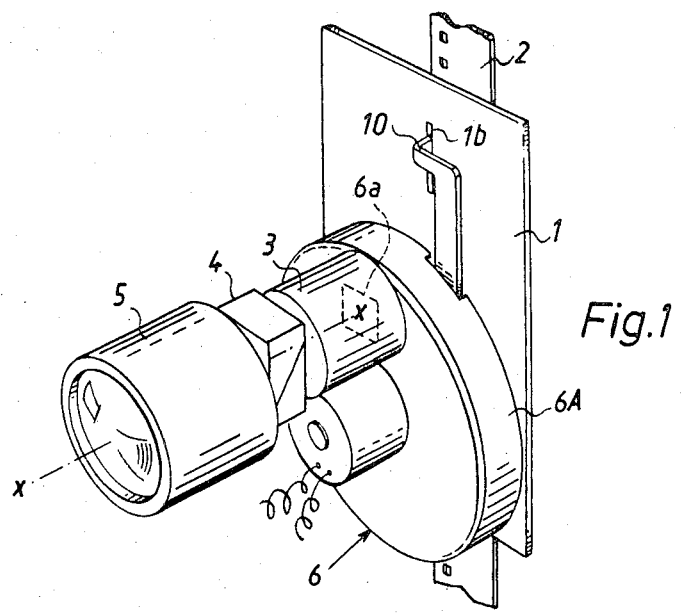
Fig.1
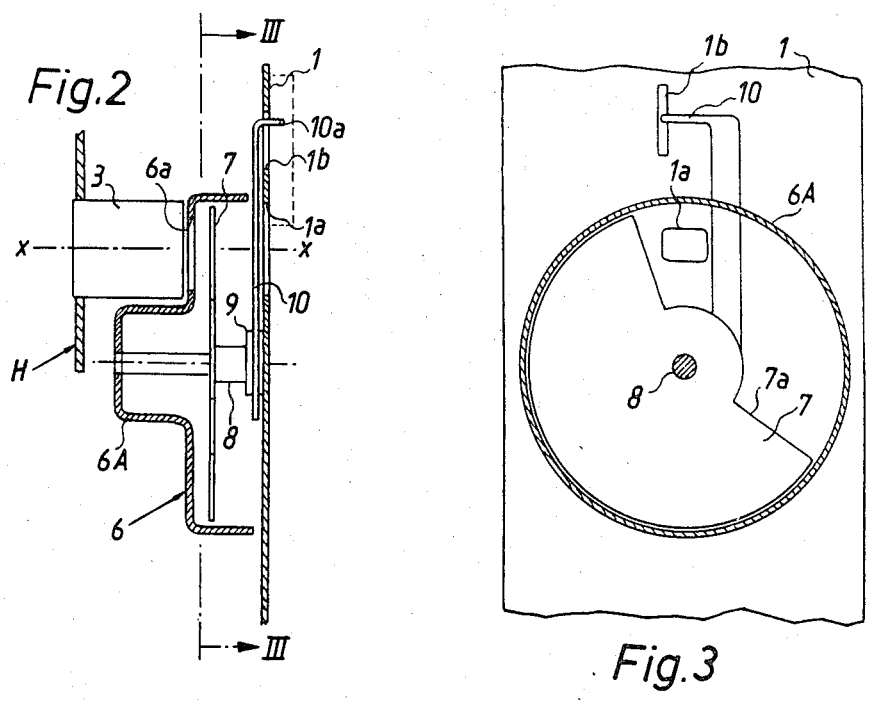
Fig.2
Fig.3

3,768,895

CINEMATOGRAPHIC APPARATUS

BACKGROUND OF THE INVENTION

The present invention relates to cinematographic apparatus in general, and more particularly to improvements in electric motors for use in motion picture cameras or projectors.

It is already known to utilize in a cinematographic apparatus a d-c motor which serves as a means for rotating the shutter and/or for actuating the film transporting mechanism. As a rule, the rotational speed of the output shaft of the d-c motor is much higher than the desired speed of the shutter so that the cinematographic apparatus must employ a step-down transmission which is interposed between the output shaft of the motor and the shutter. The shaft which drives the shutter normally also serves to transmit motion to the film transporting mechanism which can employ a conventional claw pull-down.

It was further proposed to utilize in a cinematographic apparatus an electric motor whose rated RPM is sufficiently low to allow for the mounting of shutter directly on the output shaft of the motor. For example, if the output shaft of the motor rotates at 1,080 RPM, this corresponds to a frequency of 18 frames per second. An advantage of such proposal is that the transmission can be omitted with attendant reduction in noise and lower cost of the cinematographic apparatus. Noiseless or quiet operation of a motion picture camera is particularly important if the camera is equipped with sound recording means, a feature which is becoming increasingly popular even in moderately priced motion picture cameras. A drawback of presently known electric motors which can rotate their output shafts at the RPM which is satisfactory for direct mounting of the shutter thereon is that their casings are much too bulky for incorporation in the housing of a compact motion picture camera. This is due to the fact that the plane of film transport is closely adjacent to the picture taking lens so that there is no room for the mounting of a conventional motor in such a way that the shutter can be mounted directly on the output shaft of the motor and is still capable of controlling the passage of scene light from the lens to successive unexposed film frames. Also, the presently known cinematographic apparatus which employ a shutter mounted directly on the output shaft of the motor must utilize a large-diameter shutter because the casing of the motor cannot be inserted between the lens and that film frame which registers with the lens.

SUMMARY OF THE INVENTION

An object of the invention is to provide a motion picture camera or a motion picture projector with a novel and improved prime mover, preferably an electric motor, which occupies so little room and rotates its output shaft at such a speed that the output shaft can directly support the shutter and that such shutter can control the passage of light between the picture taking lens and successive film frames or vice versa.

Another object of the invention is to provide a cinematographic apparatus which embodies the improved prime mover and whose housing is more compact than the housings of conventional cinematographic apparatus.

A further object of the invention is to provide a cinematographic apparatus wherein the prime mover can drive the shutter and/or the film transporting mechanism without the interposition of a transmission so that the apparatus is less expensive and produces less noise than heretofore known cinematographic apparatus.

An additional object of the invention is to provide a novel and improved casing for the motor which drives the shutter and/or the film transporting mechanism in a motion picture camera or motion picture projector.

The invention is embodied in a cinematographic apparatus which comprises a housing, a picture taking lens which is mounted in the housing, a film guide which is mounted in the housing behind the picture taking lens, and an electric motor (preferably a d-c motor) having a flat casing which is preferably of circular outline and includes a flat portion located between the film guide and the picture taking lens, a light-admitting opening provided in such casing portion in register with the picture taking lens and with a light-admitting opening of the film guide, and a rotor which is mounted directly on the output shaft of the motor and constitutes a shutter which is arranged to periodically allow light passing through the picture taking lens to reach the film which is guided by the film guide, or vice versa. The rotor is preferably a flat disk having a preferably segmentshaped aperture which registers with the openings of the motor casing and film guide during a predetermined portion of each revolution of the rotor.

The rotor is preferably rigid with an eccentric cam or analogous actuating means for a claw pull-down or analogous film transporting means. The RPM of the rotor is such that the cinematographic apparatus can admit scene light to a desired number of film frames per unit of time or that the light which passes through successive frames of exposed and developed film can pass through the lens of a projector at a desired frequency.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a portion of a cinematographic apparatus which embodies the improved electric motor;

FIG. 2 is a sectional view of the motor and of the film guide; and

FIG. 3 is a sectional view as seen in the direction of arrows from the line III—III of FIG. 2.

DESCRIPTION OF THE PREFERRED EMBODIMENTS

Referring to the drawing in detail, and first to FIG. 1, there is shown a portion of a motion picture camera for use with 8-millimeter film 2. The film 2 is located behind and is guided by a plate-like guide 1 having a light-admitting or light-transmitting opening 1a (see FIGS. 2 and 3) registering with a picture taking zoom lens which includes a rear portion 3 mounted in the housing H of the camera, a light-dividing prism 4 and an axially movable front portion 5. The prism 4 directs a portion of incoming scene light into the view finder and/or against a suitable photosensitive receiver, not shown. The film guide 1 is further provided with a vertical slot 1b for the claw 10a (see FIG. 2) of a reciprocable film transporting member here shown as a conventional claw pull-down 10.

In accordance with a feature of the invention, the housing H of the motion picutre camera further accommodates an electric motor 6 having a novel flat casing 6A of circular outline. The upper portion of the casing 6A extends into the narrow space between the rear portion 3 of the picture taking lens and the front side of the film guide 1 and is provided with a light-admitting or light-transmitting opening 6a in register with the lens and with the opening 1a. The right-hand axial end of the casing 6A, as viewed in FIG. 2, can be mounted directly on the film guide 1 and the central portion or dome of the casing 6A can be mounted in the housing H so that the casing is located in a predetermined position relative to the parts 1 and H. The rotor 7 of the motor 6 is a flat disk which constitutes the shutter of the motion picture camera and has a segment-shaped aperture 7a (see FIG. 3) which admits scene light to the foremost unexposed film frame during a predetermined portion of each revolution of the output shaft 8 of the motor 6. The output shaft 8 may be journalled in the film guide 1 and is rigid with the rotor 7 as well as with an eccentric disk-shaped cam 9 which constitutes the actuating means for the film transporting pull-down 10. The plane of the rotor 7 is located between the openings 1a and 6a. Since the rotor 7 is mounted directly on the output shaft 8 of the motor 6, and since the output shaft 8 further directly supports the cam 9, the motion picture camera need not embody a transmission which brings about substantial savings in initial cost, savings in time for assembly of the apparatus, savings in space, and a substantial reduction of noise.

The pull-down 10 is biased against the periphery of the cam 9 by a suitable spring, not shown. If desired, the actuating means for the pull-down 10 may comprise two cams one of which serves to positively move the pull-down in a first direction and the other of which positively moves the pull-down in the opposite direction. The in-and-out means for the claw 10a of the pull-down 10 is not shown in the drawing because its construction forms no part of the present invention.

It is clear that the improved cinematographic apparatus is susceptible of many additional modifications. For example, the motor 6 can be used with equal advantage in a motion picture projector. Also, the apparatus may embody a suitable diaphragm which can be mounted in the front portion 5 or in the rear portion 3 of the picture taking lens.

As best shown in FIG. 2, the height (as considered in the direction of optical axis X—X) of that portion of the flat casing 6A which is located in the narrow space between the rear portion 3 of the lens and the film guide 1 is only a small fraction of the diameter or maximum dimension of the casing 6A. Also, the overall axial length of the casing 6A is preferably less than its diameter; this renders it possible to accommodate the casing 6A in the housing H of a small portable motion picture camera and/or in the housing of a compact motion picture projector. The entire rotor 7 is preferably concealed in the interior of the casing 6A. The height of that portion of casing 6A which is located between the rear portion 3 of the lens and the film guide 1 is less than the focal length of the lens, and the radius of the housing 6A substantially exceeds the width of the film 2. The exact dimensions of the casing 6A are normally selected in dependency on the focal length of the lens, the type of film used and certain other factors.

The exact construction of those components of the motor 6 which rotate the rotor 7 when the circuit of the motor is completed forms no part of the invention. FIG. 1 merely shows two conductors which can be connected to the respective poles of an energy source in response to closing of a suitable switch, not shown.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a cinematographic apparatus, a combination comprising a housing; a lens mounted in said housing; a film guide mounted in said housing behind said lens; and an electric motor comprising a flat casing including a portion disposed between said lens and said film guide and having light-transmitting opening means in register with said lens and with the film in said film guide so that, in the absence of an obstruction between said lens and said film guide, scene light entering said housing by way of said lens can impinge on the film in said film guide, said motor further comprising a rotor mounted in said flat casing and having a portion which normally intercepts scene light passing through said lens so that such light cannot reach the film in said film guide, said portion of said rotor being arranged to periodically allow scene light to pass through said opening means and to reach the film in said film guide in response to rotation of said rotor.

2. A combination as defined in claim 1, wherein said portion of said rotor is a flat disk having an aperture which registers with said opening means during a predetermined portion of each revolution of said rotor.

3. A combination as defined in claim 1, wherein said casing is of at least substantially circular shape.

4. A combination as defined in claim 1, further comprising film transporting means actuatable to transport the film relative to said film guide and actuating means connected for rotation with said rotor and arranged to actuate said film transporting means.

5. A combination as defined in claim 4, wherein said film transporting means comprises a reciprocable claw pull-down.

6. A combination as defined in claim 5, wherein said actuating means comprises cam means.

7. A combination as defined in claim 4, wherein said rotor further comprises a rotary shaft rigid with said actuating means.

8. A combination as defined in claim 7, wherein said shaft is journalled in said film guide.

9. A combination as defined in claim 1, wherein said film guide has an opening in register with said opening means of said portion of said casing, said portion of said rotor being disposed in a plane which is normal to the axis of said lens.

10. A combination as defined in claim 1, wherein said motor is a d-c motor.

* * * * *